Figure 1:
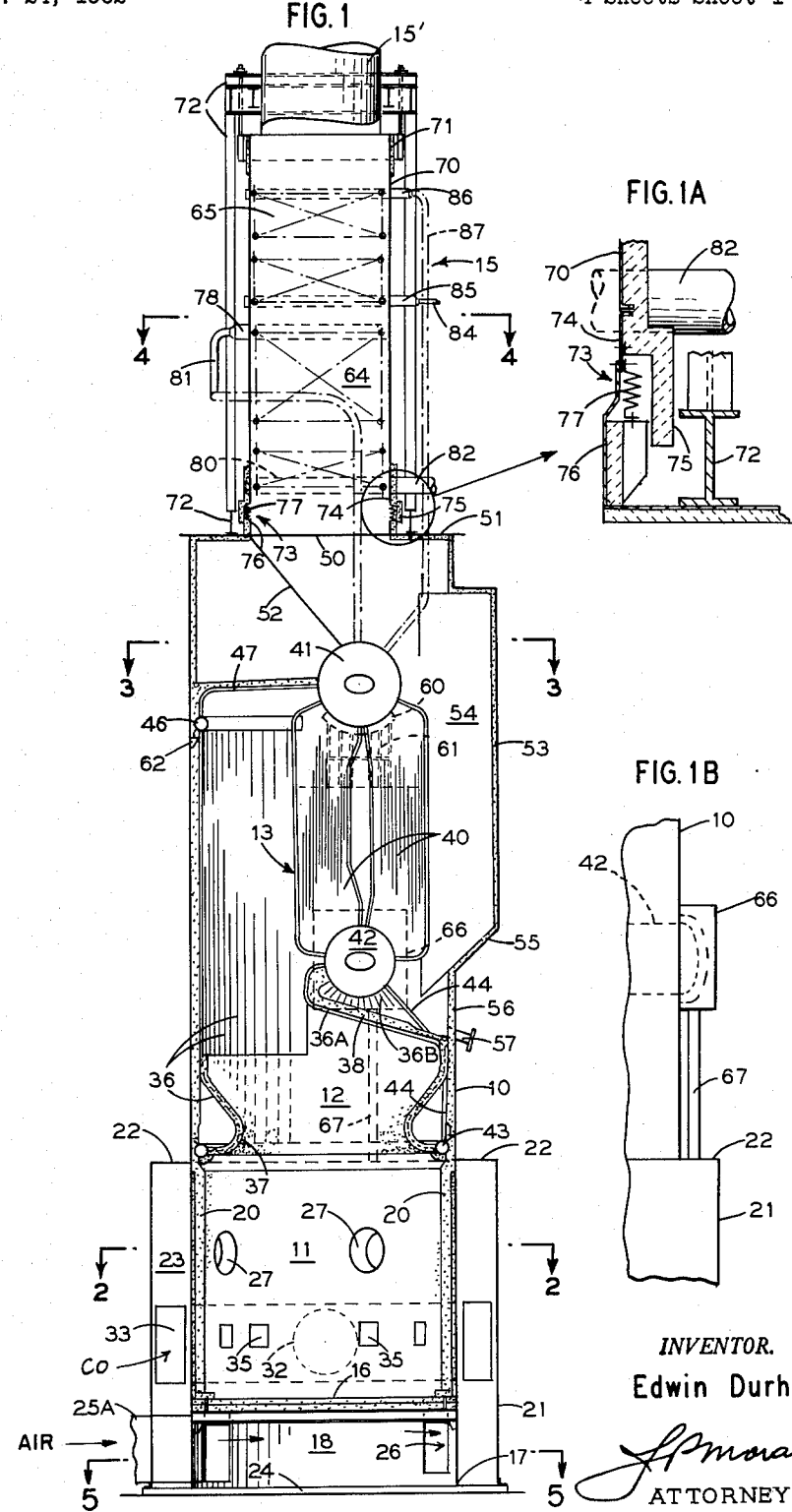

Sept. 21, 1965 E. DURHAM 3,207,135
APPARATUS FOR GENERATING VAPOR FROM LOW HEAT CONTENT GAS
Filed Sept. 24, 1962 4 Sheets-Sheet 3
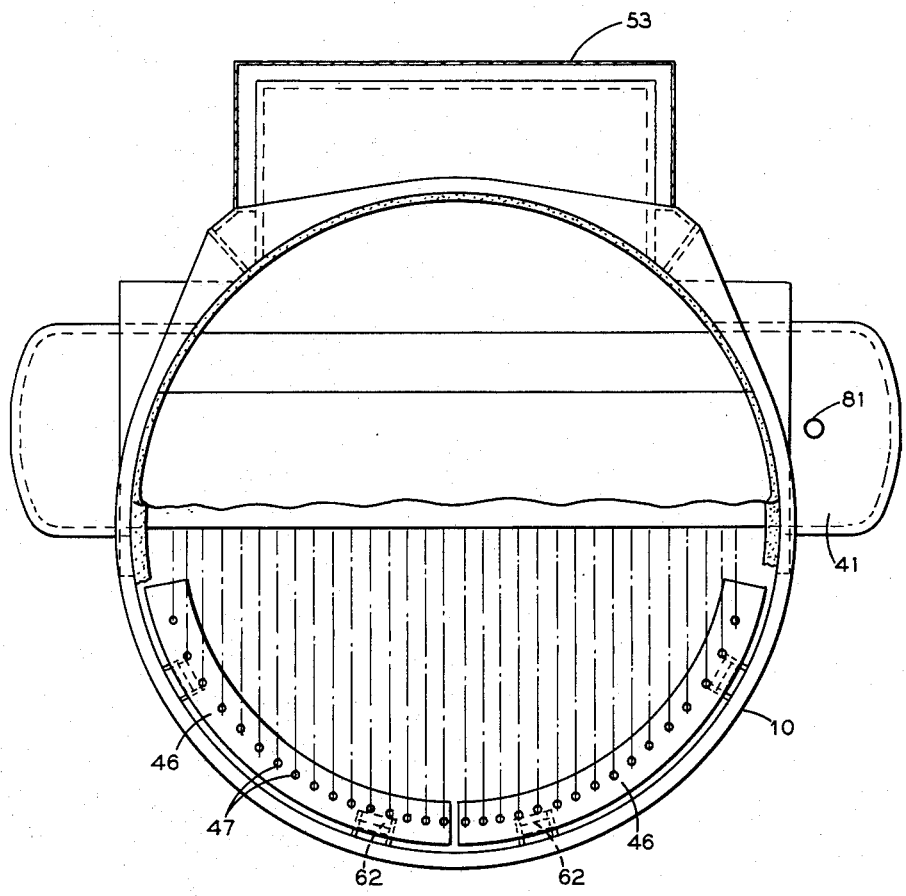
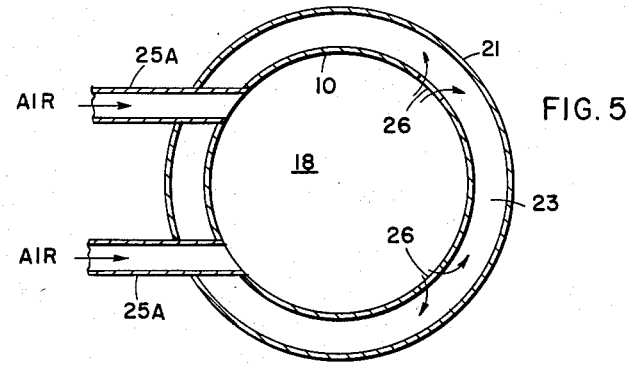

Sept. 21, 1965   E. DURHAM   3,207,135
APPARATUS FOR GENERATING VAPOR FROM LOW HEAT CONTENT GAS
Filed Sept. 24, 1962   4 Sheets-Sheet 4

United States Patent Office 3,207,135
Patented Sept. 21, 1965

3,207,135
APPARATUS FOR GENERATING VAPOR FROM LOW HEAT CONTENT GAS
Edwin Durham, Wadsworth, Ohio, assignor to The Babcock & Wilcox Company, New York, N.Y., a corporation of New Jersey
Filed Sept. 24, 1962, Ser. No. 225,511
5 Claims. (Cl. 122—510)

The present invention relates to the combustion of and the recovery of heat from a low heat content fuel, and more particularly to a novel arrangement of apparatus for the recovery of sensible and latent heat from low heat content fuel in the generation of steam.

The invention is particularly applicable to the recovery of heat from gases obtained during the regeneration of catalyst used in the refining of petroleum. The regeneration of the catalyst involves the introduction of oxygen containing gases into a hot bed of the carbon coated catalyst to burn off the carbon. The gases resulting from the catalyst regeneration ordinarily contain carbon monoxide, a small percentage of oxygen, and traces of hydrocarbons, in addition to large volume of inert gases, such as carbon dioxide, nitrogen, and water vapor. A typical heat content of the gases passing from a catalyst regenerator lies in the range of from 15 to 25 B.t.u.'s per cubic foot (standard temperature and pressure) of gas, with the gases usually having a considerable amount of sensible heat available at a temperature of the order of 1000° F., or higher. In some cases, the sensible heat may be reduced by cooling in a waste heat boiler with the resulting temperature of the gases being as low as 500° F. or lower. The CO containing gases obtained from a catalyst regenerator ordinarily cannot be burned under self-sustaining combustion conditions due to their low heat content. Such gases, however, can be burned when the gas temperatures are maintained above a temperature range of 1500° to 1600° F., and preferably at about 1800° F., where gas ignition temperatures are attained by the use of a supplemental high heat content fuel, such as natural gas, fuel, oil, or the like. The fuel is burned in a furnace to raise the temperature of the low heat content gas to ignition temperature and to mix the products of combustion from both fuels.

In accordance with this invention a relatively thick-walled metallic shell of upright generally cylindrical configuration provides a casing enclosing the combustion chamber and the generating surfaces of a boiler. The pressure parts of the boiler are advantageously supported by the metallic casing, so that expansion and contraction of the parts occur from a fixed support position adjacent the upper steam and water drum of the boiler. Additional heat exchange surfaces, which may take the form of economizer elements, are conveniently mounted on and supported from the top of the casing for a compact economical installation.

The various features of novelty which characterize my invention are pointed out with particularly in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:
FIG. 1 is an elevation, in section, of a vapor generating and superheating unit constructed in accordance with the present invention;
FIG. 1A is an enlarged view of a portion of the apparatus shown in FIG. 1;
FIG. 1B is a side elevation view of the lower water drum portion of the apparatus shown in FIG. 1.

FIGS. 2, 3, 4, and 5 are sections taken on the lines 2—2; 3—3; 4—4; and 5—5 respectively, of FIG. 1.

In general, the present invention includes an upright generally cylindrical casing 10 having an externally air cooled primary furnace 11 in its lower portion; an internally water cooled secondary furnace 12 in its intermediate portion; and the gas-pass 13 of a boiler positioned in its upper portion. The casing is constructed and arranged to support the pressure parts of the boiler, and to support heat exchange surfaces 15 and a stack 15' positioned above the boiler.

Figure 2:
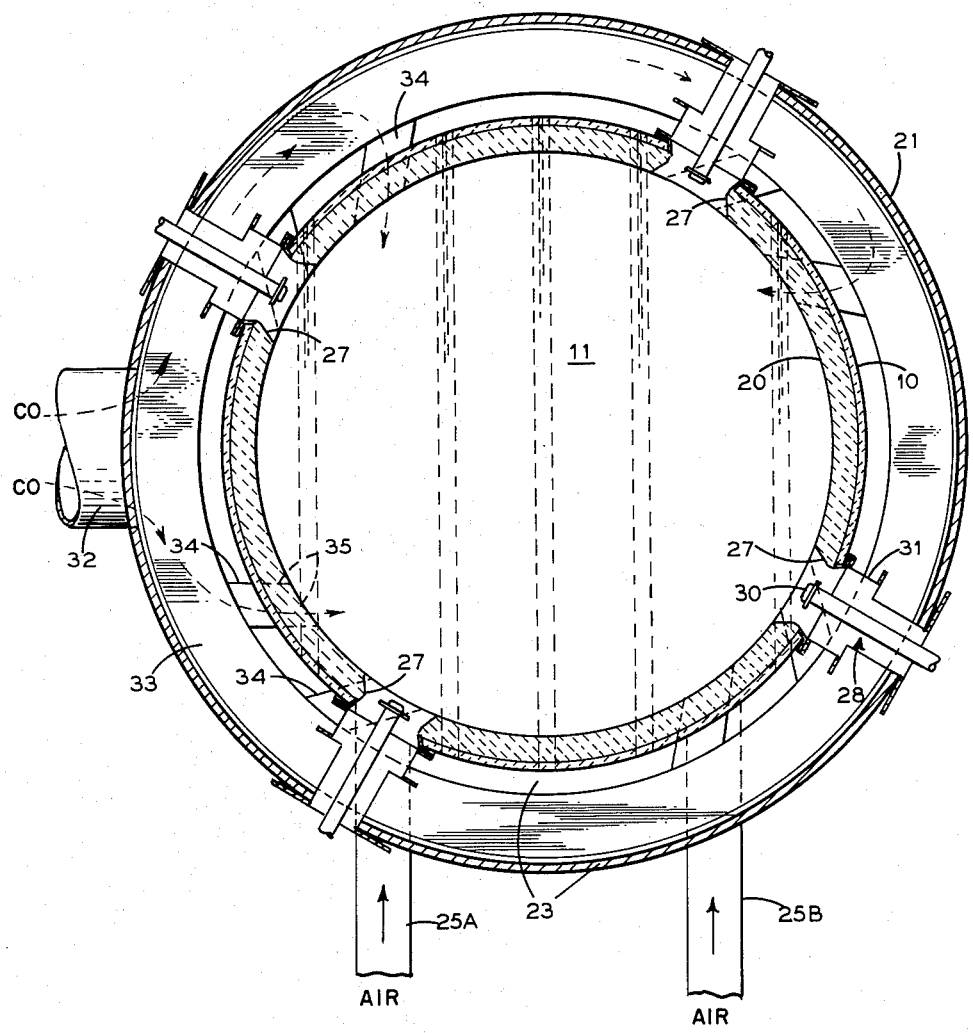
Figure 4:
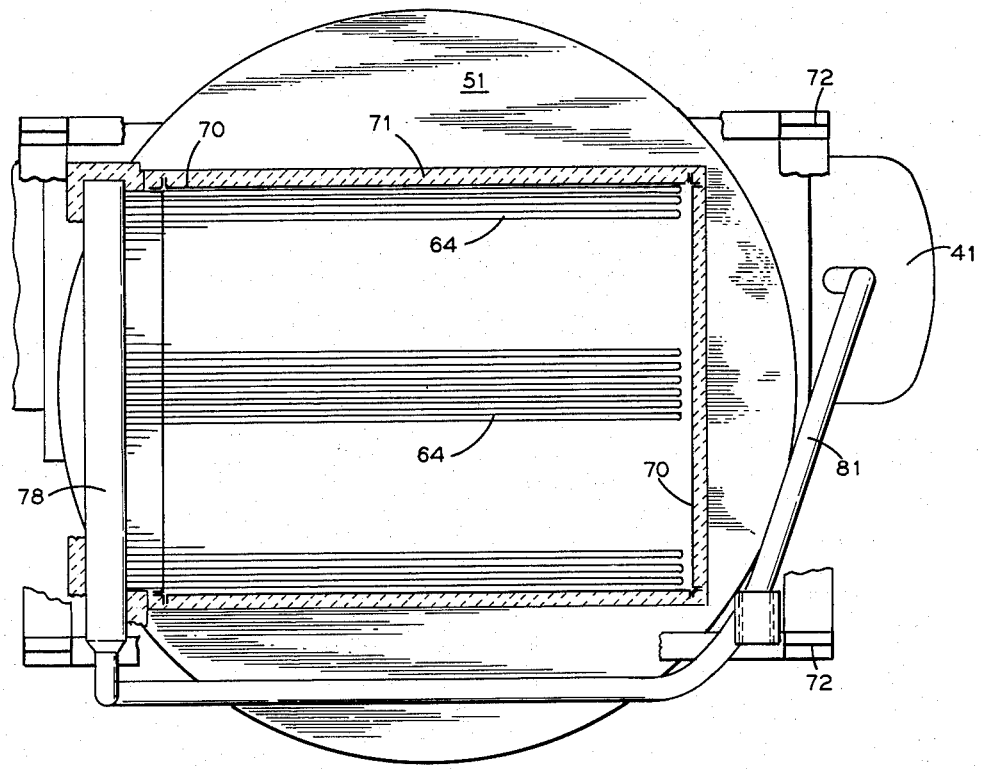

As shown in FIG. 1, the furnace 11 is provided with a horizontally disposed bottom or floor 16 which is spaced above the lower end 17 of the casing to form an air plenum chamber 18 beneath the furnace. To protect the metallic casing 10 the furnace is lined by a layer of refractory materials 20. As shown in FIGS. 1 and 2, the furnace portion of the casing 10 is surrounded by a cylindrical housing 21 which is coaxial with and outwardly spaced from the exterior surface of the casing 10. The housing 21 is connected with the casing by a horizontally disposed annular plate member 22 which is attached to both the casing and the housing to form the upper side of an annular chamber 23. The lower end of the annular chamber 23 is closed by the foundation 24.

Air is admitted to the plenum chamber 18 through a pair of air inlet ducts 25A and 25B which extend through the annular chamber 23 from external forced draft fans (not shown). The air admitted under pressure into the plenum chamber discharges through a pair of outlet openings 26 into the annular chamber 23 (see FIG. 5). The outlet openings 26 from the plenum chamber are dimensioned to provide sufficient pressure drop so as to properly distribute the air flow therethrough substantially equally between the outlets and thus into the chamber 23.

As shown particularly in FIG. 2, a circumferentially equally spaced series of burner ports 27 are positioned in the wall of the casing 10 and the refractory material 20. Each of the burner ports is provided with a high heat value fuel burner assembly 28, including an atomizer 30 for fuel oil introduction, and a louvered air inlet box 31 for the controlled flow of air from the annular chamber 23 through each of the burner ports. The burner ports are positioned in a common horizontal plane in the upper portion of the primary combustion chamber 11.

Referring again to FIG. 2, the CO containing gas obtained from a catalyst regenerating kiln (not shown) is passed through a duct 32 which extends through the housing 21 to discharge into an annular manifold 33 which is horizontally disposed to encircle the casing 10. The manifold 33 is of rectangular vertical section and is spaced between the casing 10 and the housing 21 at a level beneath the fuel burner ports 27. The manifold 33 is provided with a circumferentially arranged series of offtake ducts 34 which open to angularly positioned ports 35 extending through the wall of the casing and the refractory lining 20 thereof. The ports 35 and connecting ducts 34 are arranged to introduce the gas at high velocity in a direction having tangential components of motion. As shown in FIG. 2 the gases injected through the ports 35 will have a counter-clockwise rotation within the furnace 11 and will impart a spinning motion to the gases formed by the combustion of the high heat content fuel for the upward combined gas movement through the furnace chamber 11.

The combined gases pass upwardly from the furnace 11 into the secondary combustion chamber 12 which is lined by upright fluid cooled tubes 36 which define a lower orifice 37 and, in part, an upwardly spaced wing baffle 38. The gases are thoroughly mixed in passing through the orifice and are deflected to one side of the casing by the baffle 38. The gases flowing upwardly between the wing baffle and the oppoiste wall of the casing turn to pass in a horizontal direction through the convection pass 13 and across generally upright banks of tubes 40 connecting upper and lower drums 41 and 42, respectively. Thereafter the gases pass upwardly around the upper drum 41 and thence in an upper direction to pass over heat exchange surfaces 15, including, for example, superheating and economizer sections positioned on top of the casing 10.

The tubes 36 forming the orifice 37 and lining the secondary combustion space 12 are supplied with water from a horizontally disposed annular header 43 which is positioned closely adjacent the inner surface of the casing 10 and provided with water from the drum 42 through supply tubes 44. The tubes 44 are arranged to distribute the water supply to the header for generally uniform delivery of water to the tubes 36. Advantageously the header 43 may be formed in separate segments for ease of installation within the casing 10. As hereinafter described, the pressure parts of the boiler are pendently supported from the casing 10, so that thermal movement of the header 43 will be largely in a vertical direction relative to the adjacent portion of the casing, and the refractory lining 20 is constructed to permit such relative movement. In defining the orifice 37, the tubes 36 extend radially inwardly in a horizontal direction from the header 43 and are then bent in an upward and outward inclination to return generally to wall alignment within the casing 10.

A major portion of the circumferential row of tubes 36 extend upwardly along the inner surface of the refractory lining of the casing 10 between the nose baffle 38 and the casing wall to an upper header 46 which is formed as the section of a circle. The steam and the water mixture entering the header 46 passes through riser tubes 47 to the upper drum 41. Some of the remaining tubes 36, designated 36A, of the circumferential row line the wall of the secondary furnace 12, and are bent inwardly to form the wing or nose baffle 38, with the upper ends thereof opening to the lower drum 42. Other of the tubes 36, designated 36B, extend along the wall of the secondary furnace 12 to open directly into the lower drum 42.

The heating gases produced in the furnace 11 are mixed in passing through the orifice 37 and are deflected toward one side of the setting by the wing baffle 38. Thereafter the gases pass upwardly through the gas pass 13 and then over the convection heat exchange banks 40 to heat the fluid contained therein and to discharge a mixture of water and steam to the drum 41. Some of the rearmost tubes of the bank 40 serve as downcomers to supply water to the lower drum 42. In leaving the rearmost bank 40 the gases move upwardly through an outlet 50 formed in a cover plate 51 mounted on the top of the casing 10. A plate member 52 extends transversely across the upper portion of the casing 10 from the drum 41 to one edge of the opening 50 to direct gas flow toward the outlet. A flat sided extension 53 is formed on the upper portion of the casing 10 directly behind the tube banks 40 to form a gas turning space 54. This structure is shown in FIGS. 1 and 3, with the extension having a downwardly and inwardly disposed bottom plate 55 so that solid particles separated from the gas stream may be collected in the pocket formed by the upper side of the wing baffle 38 and a portion 56 of the adjacent casing 10. The collected solid particles may be withdrawn through a normally closed spout 57.

As shown particularly in FIG. 1, the upper drum 41 is supported on the casing 10 by saddles 60 which are in turn directly mounted on brackets 61 attached, as by welding, to the casing 10. In a similar manner the header 46 is supported on brackets 62 which are likewise attached to the casing 10. Thus, all the pressure parts including the drums 41 and 42, as well as the headers 43 and 46 and the interconnecting tubes are suspended from a substantially common level defined by brackets 61 and 62 from the casing with the thermal expansion of the pressure parts being in a substantially vertical direction relative to the casing 10.

Since movement of the drum 42 will be generally in a vertical direction, the casing 10 must be provided with means therein to accommodate this movement. While the gap between the openings in the casing and the drum 42 surfaces may be sufficiently sealed to avoid appreciable gas or air leakage therebetween, as a safety precaution it is advantageous to eliminate any leakage of CO containing gases outwardly of the casing 10. To this end, a cap member 66, see FIG. 1B, is attached to the casing 10 so as to enclose the projecting ends of drum 42. The interior of the cap member 66 is pressurized by air delivered thereto through a pipe 67 from the annular chamber 23. With this construction leakage between the drum 42 end portion and the corresponding opening in the casing will be into the furnace since the pressure of the seal air supplied by pipe 67 is appreciably higher than the pressure prevailing in the furnace.

While the temperature of the gases generated in the furnace 11 will be reduced by heat exchange with the heat exchange surfaces of the boiler, the gases leaving the outlet opening 50 will still contain an appreciable amount of sensible heat which may be, at least partially, recovered by contact with additional heat exchange surfaces 15. In the embodiment of the invention shown in the drawings, the gases are further cooled by contact with steam super-heating elements 64 and economizer surfaces 65 advantageously positioned above and supported on the casing 10. It will be understood, the superheater surfaces may be installed at another location in the unit, such as upstream (in a gas flow sense) of the tube bank 40, and the surfaces 15 may consist entirely of economizer tubes. The location of the superheater will be largely governed by the superheat steam temperature desired.

The superheater and economizer sections are enclosed in a gas-tight casing 70 of rectangular cross-section (see FIG. 4) having an exterior coating of insulating material 71 where the upper and lower ends of the casing are open for the passage of gases therethrough. The casing is supported at the top from a structural framework 72 mounted on the plate 51 of the casing 10. With the heat exchange elements of the superheater and economizer supported from the casing 70, the casing is provided with an expansible seal unit 73 adjacent the top plate 51 for relative vertical movement between the plate 51 and the lower end 74 of the casing 70. The seal unit 73 (see FIG. 1A) includes an outwardly spaced depending flange 75 constructed in outwardly spaced relation to corresponding upwardly extending flanges 76. A bellows type expansion member 77 maintains a gas tight connection between a portion of the flanges 76 and the lower end 74 of the casing 70.

The superheating elements 64 are formed by continuous tubes formed as U-bends to extend horizontally across the casing 70 and opening at opposite ends into an inlet header 78 and an outlet header or collecting manifold 80. Steam discharges from the drum 41 through steam pipe 81 to the inlet header, passes in countercurrent flow to the gases in moving through the elements 64 to the outlet manifold 80 for discharge as superheated steam through the pipe 82.

The elements of the economizer are also formed as continuous tubes 83 having a plurality of U-bends therein and arranged to extend horizontally across the casing 70. The tubes receive makeup water from a pipe 84 discharging into inlet header 85. After passing through the economizer tubes in concurrent heat exchange relationship to the heating gases the heated makeup water is collected in an outlet header 86 and passed through feed pipe 87 to the upper drum 41.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

The claims are:

1. A boiler setting comprising an upwardly elongated generally cylindrical metallic casing, a vapor generator positioned within said casing, means for supporting said vapor generator from and on the upper portion of said casing, means forming a combustion chamber within the lower portion of said casing for the generation of heating gases therein, means for cooling the combustion chamber portion of said casing by the flow of air thereover, including wall means forming an annular chamber enclosing the combustion chamber portion of said casing, means for introducing superatmospheric pressure air into said annular chamber, fuel burner means positioned in said casing receiving combustion air from said annular chamber for the introduction of air and high heat content fuel into said combustion chamber, port means positioned in the casing beneath said fuel burner means, a duct located within said annular chamber and spaced from the casing and the wall means of said annular chamber and connected with said port means, duct means extending through the wall means of said annular chamber to said duct for the introduction of low heat content fuel into said duct and thence through said port means into said combustion chamber, and means for cooling the upper portion of said casing exposed to high temperature heating gases from said combustion chamber including upright tubes connected into the fluid circulating system of said vapor generator.

2. A boiler setting comprising an upwardly elongated generally cylindrical metallic casing, a housing surrounding the lower portion of said casing in substantially uniform radially spaced relationship, an annular plate connecting the top of said housing and the exterior wall of said casing, said casing and housing forming an annular chamber therebetween, means for passing a controlled flow of air through said annular chamber and into the lower portion of said casing, a vapor generator including upper and lower drums positioned in the upper portion of said casing and having their opposite ends extending outwardly of said casing, tubes interconnecting said drums for flow of fluid therebetween including a circumferential row of tubes positioned along the interior surface of a part of the upper portion of said casing, means for pendently supporting said vapor generator from said casing at the level of said upper drum, a drum housing enclosing the opposite ends of said lower drum to permit thermal movement of the drum relative to said casing, and means for pressurizing said drum housing to avoid outward flow of gases between said lower drum and the casing, including a flow connection between said drum housing and said annular chamber.

3. In a vapor generator having a drum and a fluid circulating system comprising an upright generally cylindrical metallic casing, a second metallic cylindrical wall radially spaced from and encircling the lower portion of said metallic casing, an annular member connecting the upper end of said cylindrical wall with an intermediate height of said casing, means for introducing superatmospheric pressure air into the annular chamber formed between said wall and casing, fuel burner means receiving combustion air from said annular chamber to introduce air and high heat content fuel into the lower portion of said metallic casing, a plurality of port means positioned in the casing beneath said fuel burner means, an annular duct located within said annular chamber and spaced from the walls thereof and connected with each of said port means, a duct extending through said cylindrical wall to said annular duct for the introduction of low heat content fuel into said annular duct and thence through said port means into the lower portion of said casing, vapor generating means in the upper portion of said casing and supported therefrom, and upright tubes disposed along part of the inner surface of the upper portion of said casing to protect the casing, said tubes being connected in the fluid circulating system of said vapor generator.

4. A boiler setting comprising an upwardly elongated generally cylindrical metallic casing, a housing surrounding the lower portion of said casing in substantially uniform radially spaced relationship, an annular plate connecting the top of said housing and the exterior wall of said casing, said casing and housing forming an annular chamber therebetween, means for passing a controlled flow of air through said annular chamber and into the lower portion of said casing, a vapor generator including upper and lower drums positioned in the upper portion of said casing and having their opposite ends extending outwardly of said casing, tubes interconnecting said drums for flow of fluid therebetween including a circumferential row of tubes positioned along the interior surface of a part of the upper portion of said casing, means for pendently supporting said vapor generator from said casing at the level of said upper drum, a drum housing enclosing the opposite ends of said lower drum to permit thermal movement of the drum relative to said casing, and means for pressurizing said drum housing to avoid outward flow of gases between said lower drum and the casing.

5. A boiler setting comprising an upwardly elongated generally cylindrical metallic casing, a housing surrounding the lower portion of said casing in substantially uniform radially spaced relationship, an annular plate connecting the top of said housing and the exterior wall of said casing, said casing and housing forming an annular chamber therebetween, means for passing a controlled flow of air through said annular chamber and into the lower portion of said casing, a plurality of port means positioned in said casing, an annular duct within said annular chamber and spaced from the walls of said chamber and connected with said port means, a duct extending through said housing to said annular duct for the introduction of gaseous fuel into the annular duct and thence through said port means, a vapor generator including upper and lower drums positioned in the upper portion of said casing and having their opposite ends extending outwardly of said casing, tubes interconnecting said drums for flow of fluid therebetween including a circumferential row of tubes positioned along the interior surface of a part of the upper portion of said casing, means for pendently supporting said vapor generator from said casing at the level of said upper drum, a drum housing enclosing the opposite ends of said lower drum to permit thermal movement of the drum relative to said casing, and means for pressurizing said drum housing to avoid outward flow of gases between said lower drum and the casing.

References Cited by the Examiner

UNITED STATES PATENTS

| | | | |
|---|---|---|---|
| 2,034,677 | 3/36 | Jones | 122—6 |
| 2,228,938 | 1/41 | Wood | 122—6 |
| 2,582,830 | 1/52 | Hawley. | |
| 2,647,495 | 8/53 | Moore | 122—333 |
| 2,840,049 | 6/58 | Durham | 122—7 |
| 2,959,158 | 11/60 | Sprague | 122—510 |
| 2,976,855 | 3/61 | Downs | 122—70 |
| 3,009,513 | 11/61 | Houdry | 122—7 |

FOREIGN PATENTS 870,735    6/61  Great Britain.

PERCY L. PATRICK, *Primary Examiner.*

FREDERICK L. MATTESON, Jr., *Examiner.*